(12) United States Patent
Winter et al.

(10) Patent No.: US 7,321,720 B2
(45) Date of Patent: Jan. 22, 2008

(54) METHOD AND APPARATUS FOR PRELIMINARY ERASING PARTS OF A BITSTREAM RECORDED ON A STORAGE MEDIUM, AND CORRESPONDING STORAGE MEDIUM

(75) Inventors: Marco Winter, Hannover (DE); Harald Schiller, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 958 days.

(21) Appl. No.: 10/415,211

(22) PCT Filed: Oct. 15, 2001

(86) PCT No.: PCT/EP01/11868

§ 371 (c)(1),
(2), (4) Date: Apr. 24, 2003

(87) PCT Pub. No.: WO02/35546

PCT Pub. Date: May 2, 2002

(65) Prior Publication Data

US 2004/0101273 A1 May 27, 2004

(30) Foreign Application Priority Data

| Oct. 27, 2000 | (EP) | ................... 00250362 |
| Oct. 30, 2000 | (EP) | ................... 00250363 |
| Nov. 1, 2000 | (EP) | ................... 00250366 |
| Jan. 9, 2001 | (EP) | ................... 01250011 |

(51) Int. Cl.
*H04N 5/91* (2006.01)
*H04N 7/00* (2006.01)

(52) U.S. Cl. .................. 386/98; 386/98; 386/125; 360/60

(58) Field of Classification Search .................. 386/98, 386/125; 360/60
See application file for complete search history.

(56) References Cited

U.S. PATENT DOCUMENTS

2001/0014058 A1 * 8/2001 Ando et al. ................... 369/32

FOREIGN PATENT DOCUMENTS

EP   1021048   7/2000

* cited by examiner

*Primary Examiner*—Thai Q. Tran
*Assistant Examiner*—Girumsew Wendmagegn
(74) *Attorney, Agent, or Firm*—Joseph J. Laks; Robert D. Shedd; Reitseng Lin

(57) ABSTRACT

DVD Stream Recording allows to recover or permanently erase on-the-fly preliminarily erased cells on the disc. In case of very low-bitrate stream recording there could be less than one application packet and therefore timestamp per Stream Object Unit. In such situation, stuffing is necessary in order to guarantee the proper functioning of the Mapping List data retrieval. To make on-the-fly preliminarily erasure, complete recovery or permanent erase possible even for stuffing data packets located at cell boundaries, to two special timestamps defining a preliminarily erased cell and two other timestamps defining the location of a normal cell a different meaning is assigned under specific circumstances.

10 Claims, 5 Drawing Sheets

METHOD AND APPARATUS FOR PRELIMINARY ERASING PARTS OF A BITSTREAM RECORDED ON A STORAGE MEDIUM, AND CORRESPONDING STORAGE MEDIUM

This application claims the benefit, under 35 U.S.C. § 365 of International Application PCT/EP01/11868, filed Oct. 15, 2001, which was published in accordance with PCT Article 21(2) on May 2, 2002 in English and which claims the benefit of European patent application No. 00250362.1, filed Oct. 27, 2000; European patent application No. 00250363.9, filed Oct. 30, 2000; European patent application No. 00250366.2, filed Nov. 1, 2000; and European patent application No. 01250011.2, filed Jan. 9, 2001.

The invention relates to a method and to an apparatus for preliminarily erasing a part or parts of a bitstream recorded on a storage medium, and relates to a corresponding storage medium, which part or parts can thereafter be erased permanently or reconstructed completely.

BACKGROUND

The DVD (digital versatile disc) Stream Recording system is defined in the DVD Stream Recording Specification (SR spec.), Version 0.9, and is designed to use rewritable and recordable DVD discs for recording any existing digital bitstreams, editing them and replaying them as bitstreams.

According to the SR spec., a Stream Object (SOB) is, in general, one recorded bitstream, i.e. one take, which is stored as a part of a Program Stream as described in e.g. ISO/IEC 13818-1, Systems (MPEG-2). A SOB is composed of one or more Stream Packs, each containing a pack header followed by a Stream Packet. A Stream Packet contains further header data and Application Packets (AP_PKT) to each of which an Application Timestamp (ATS) is assigned. These timestamps enable proper application packet delivery during playback.

On the SR disc, a Stream Object Unit (SOBU) is the basic unit of a SOB and consists of a constant amount of data, 64 Kbytes according to the SR specification. The Stream Object Units include above Application Packets. Neither the SOBU borders nor the Stream Pack border need to be aligned with Application Packet borders.

For data retrieval from the disc a Mapping List is used wherein to each Stream Object Unit a corresponding specific time duration is assigned.

One feature of the DVD Stream Recording Specification is the possibility of temporary erasure (TE) of a cell containing a part of a SOBU or up to several Stream Object Units, followed by either recovery or permanent erasure (PE) of the cell. In the case of permanent erasure, any complete Stream Object Units within the cell can be freed for re-use. A cell can start or end at any application packet.

To each usable side of a disc an information file is assigned, the content of which is stored in a memory, e.g. a RAM, that is part of the streamer device.

INVENTION

The current version of this DVD Stream Recording Specification allows to re-use or recover on-the-fly temporarily erased cells or areas of a DVD stream recording disc.

In case of very low-bitrate stream recording there could be less than one application packet and therefore less than one ATS per Stream Object Unit. In such situation, stuffing is necessary in order to guarantee the proper functioning of the Mapping List data retrieval. Stuffing is done by means of stuffing packets, and the purpose of these stuffing packets replacing application packets is to ensure that every Stream Object Unit—even in areas where stuffing is performed—contains at least one Application Time Stamp value. But according to the current version of the SR spec., temporary erasure (TE) is not possible for stuffing of Stream Object Units located at TE cell boundaries.

There is the further condition in the SR spec. that a Stream Object must not begin or end with a stuffing packet.

A problem to be solved by the invention is to allow such temporary erasure of cells in connection with stuffing. This problem is solved by the method disclosed in claim 1.

An apparatus that utilises this method is disclosed in claim 2. A storage medium that utilises this method is disclosed in claim 3.

The above mentioned information file can contain a lot of timestamps of different type, which timestamps serve for instance for temporally erasing cells on-the-fly, e.g. an advertisement in a movie.

If during a recording the remaining disc capacity approaches zero, the streamer device can use the temporarily erased cells to free on-the-fly some further recording capacity by searching in the information file for information about the location of such temporarily erased cells, without the need of reading the disc or the stream content itself.

Some of the timestamps are defined such that on-the-fly either a permanent erasure of such temporarily erased cells or stream parts can be carried out, or a complete cell recovery of the original recording is possible even when a temporarily erased cell contains stuffing packets.

Two special timestamps defined in the SR spec. indicate a TE area or cell or bitstream part. Two other timestamps define the location of a normal cell. According to the invention, to some of these four types of timestamps a different meaning is assigned under specific circumstances.

The process of re-using such an area (i.e. temporarily erased cells) is re-defined in order to guarantee a handling consistent with the rest of the DVD SR specification. By such amended timestamp definition it becomes possible to perform temporary erasure, complete recovery and permanent erasure of bitstream areas or cells containing stuffing packets within the Stream Object Units. These features are available even if the erasure area starts or stops at or immediately before or immediately after stuffing packets. Advantageously these functions can be carried out on-the-fly. Under the above SR spec. such features are neither available nor possible.

In principle, the inventive method is suited for preliminarily erasing a part or parts of a bitstream recorded, or to be recorded, on a storage medium, wherein:
the recorded bitstream is formatted into stream object units each containing at least one application data packet with a corresponding application time stamp or one stuffing data packet or both, of which stream object units one or more form a cell, wherein each succeeding stuffing data packet also has an application time stamp;
bitstream parts can be marked as being preliminarily erased cells denoted TE cells;
following marking TE cells, such TE cells can be either permanently erased or completely reconstructed;
the start and the end of a cell are defined by a cell start time value and a cell end time value;
the start and the end of a re-usable part of a TE cell are defined by a TE cell start time value and a TE cell end time value;

said cell and TE cell start and end time values are stored in a separate memory allowing fast access, wherein in case a TE cell includes at least one boundary between succeeding stream object units and one of said succeeding stream object units includes at least one application data packet and another one of said succeeding stream object units includes at least one stuffing data packet, involved ones and further adjacent stream object units containing only stuffing data packets are included in said TE cell even if said TE cell would thereby overlap with one or two adjacent TE cells, wherein the corresponding ones of said time values of a current TE cell are selected as follows:

the cell start time value corresponds to the application time stamp of the first application packet of said current TE cell;

the cell end time value corresponds to the application time stamp of the last application packet of said current TE cell;

if the start recording packet arrival time value of said current TE cell describes the start of a stream object unit, or the TE cell contains the start of the stream object, then the TE cell start time value corresponds to the application time stamp of the first application packet or stuffing packet starting in that stream object unit which contains the application packet or stuffing packet with the start recording packet arrival time of said current TE cell, otherwise the TE cell start time value corresponds to the application time stamp of the first application packet or stuffing packet starting in that stream object unit which follows immediately the stream object unit containing the application packet with the corresponding recording packet arrival time value cell start time value;

the TE cell end time value corresponds to the first application time stamp of the first stream object unit following said current TE cell.

In principle the inventive apparatus is suited for preliminarily erasing a part or parts of a bitstream recorded, or to be recorded, on a storage medium, wherein:

the recorded bitstream is formatted into stream object units each containing at least one application data packet with a corresponding application time stamp or one stuffing data packet or both, of which stream object units one or more form a cell, wherein each succeeding stuffing data packet also has an application time stamp;

bitstream parts can be marked as being preliminarily erased cells denoted TE cells;

following marking TE cells, such TE cells can be either permanently erased or completely reconstructed;

the start and the end of a cell are defined by a cell start time value and a cell end time value;

the start and the end of a re-usable part of a TE cell are defined by a TE cell start time value and a TE cell end time value, said apparatus including:

means for recording data on said storage medium or for reading data from said storage medium;

interface means for receiving input data for said recording means or for outputting data from said recording means;

a memory storing said cell and TE cell start and end time values in order to allow fast access to said cell and TE cell start and end time values;

controlling means for controlling upon user command said preliminary erasure marking and said permanent erasure or complete reconstruction, which controlling means interact with said memory, wherein in case a TE cell includes at least one boundary between succeeding stream object units and one of said succeeding stream object units includes at least one application data packet and another one of said succeeding stream object units includes at least one stuffing data packet, involved ones and further adjacent stream object units containing only stuffing data packets are included in said TE cell even if said TE cell would thereby overlap with one or two adjacent TE cells, wherein the corresponding ones of said time values of a current TE cell are selected as follows:

the cell start time value corresponds to the application time stamp of the first application packet of said current TE cell;

the cell end time value corresponds to the application time stamp of the last application packet of said current TE cell;

if the start recording packet arrival time value of said current TE cell describes the start of a stream object unit, or the TE cell contains the start of the stream object, then the TE cell start time value corresponds to the application time stamp of the first application packet or stuffing packet starting in that stream object unit which contains the application packet or stuffing packet with the start recording packet arrival time of said current TE cell, otherwise the TE cell start time value corresponds to the application time stamp of the first application packet or stuffing packet starting in that stream object unit which follows immediately the stream object unit containing the application packet with the corresponding recording packet arrival time value cell start time value;

the TE cell end time value corresponds to the first application time stamp of the first stream object unit following said current TE cell.

In principle the inventive storage medium contains a preliminarily erased part or parts of a bitstream recorded on it, wherein:

the recorded bitstream is formatted into stream object units each containing at least one application data packet with a corresponding application time stamp or one stuffing data packet or both, of which stream object units one or more form a cell, wherein each succeeding stuffing data packet also has an application time stamp;

bitstream parts can be marked as being preliminarily erased cells denoted TE cells;

following marking TE cells, such TE cells can be either permanently erased or completely reconstructed;

the start and the end of a cell are defined by a cell start time value and a cell end time value;

the start and the end of a re-usable part of a TE cell are defined by a TE cell start time value and a TE cell end time value, wherein in case a TE cell includes at least one boundary between succeeding stream object units and one of said succeeding stream object units includes at least one application data packet and another one of said succeeding stream object units includes at least one stuffing data packet, involved ones and further adjacent stream object units containing only stuffing data packets are included in said TE cell even if said TE cell would thereby overlap with one or two adjacent TE cells, wherein the corresponding ones of said time values of a current TE cell are selected as follows:

the cell start time value corresponds to the application time stamp of the first application packet of said current TE cell;

the cell end time value corresponds to the application time stamp of the last application packet of said current TE cell;

if the start recording packet arrival time value of said current TE cell describes the start of a stream object unit, or the TE cell contains the start of the stream object, then the TE cell start time value corresponds to the application time stamp of the first application packet or stuffing packet starting in that stream object unit which contains the application packet or stuffing packet with the start recording packet arrival time of said current TE cell, otherwise the TE cell start time value corresponds to the application time stamp of the first application packet or stuffing packet starting in that stream object unit which follows immediately the stream object unit containing the application packet with the corresponding recording packet arrival time value cell start time value;

the TE cell end time value corresponds to the first application time stamp of the first stream object unit following said current TE cell.

Advantageous additional embodiments are disclosed in the respective dependent claims.

DRAWINGS

Exemplary embodiments of the invention are described with reference to the accompanying drawings, which show in:

FIG. 1 Simplified overall system for DVD Stream Recording;

FIG. 2 Structure of stream packs containing parts of stuffing packets;

FIG. 3 Example for the principle of temporary erasure including reconstruction;

FIG. 4 Example for the principle of permanent erasure of a TE part;

FIG. 5 Temporary erasure and subsequent permanent erasure;

FIG. 6 Temporary erasure and subsequent further temporary erasure and reconstruction of the first temporarily erased cell;

FIG. 7 Example for permanent erasure of a short TE Cell (TE flag '01b');

FIG. 8 Definition of the terms 'k', 'v' and 'Previous_Area';

FIG. 9 Definition of the terms 'm', 'w', 'Following_Area' and 'Stuffing_Area';

FIG. 10 Example of a program containing TE Cells;

FIG. 11 Another example of a program containing TE Cells.

EXEMPLARY EMBODIMENTS

The following abbreviations are used:

AP_PKT Application Packet, i.e. an actual payload in the bitstream.

APAT Application Packet Arrival Time, an absolute timestamp having e.g. a 48-bit value format.

ATS Application Time Stamp, a timestamp of each Application Packet in the bitstream.

ERA_S_APAT For a TE cell that contains at least one SOBU border (the TE flag is '10b'), ERA_S_APAT describes the first SOBU, which may be re-usable in case the TE Cell is permanently erased.

ERA_E_APAT For a TE cell that contains at least one SOBU border (the TE flag is '10b'), ERA_E_APAT describes the SOBU following immediately the last SOBU, which may be re-usable in case the TE Cell is permanently erased.

IAPAT Incremental Application Packet Arrival Time, e.g. a 12-bit relative timestamp representing the duration of its assigned SOBU. An IAPAT has a lower resolution than an APAT, i.e. IAPAT is an APAT without its lower significant e.g. 18 bits and without its most significant e.g. 18 bits.

MAPL Mapping List, a list of relative IAPAT timestamps, of which each is assigned to the first application packet arrival time in a SOBU.

ORG_PGC Denotes the Navigation Data that describe the Program Set, and is a chain of programs.

PE Permanent erasure.

SC_GI Stream cell general information.

S_PCK Stream Pack, i.e. a bitstream sector including e.g. an MPEG-2 Systems header.

SC_S_APAT Stream Cell Start APAT, the absolute start timestamp of a bitstream part, i.e. a stream cell start time value. The SC_S_APAT is the APAT of the first AP_PKT that belongs to this cell.

SC_E_APAT Stream Cell End APAT, the absolute end timestamp of a bitstream part, i.e. a stream cell end time value. The SC_E_APAT is the APAT of the last AP_PKT that belongs to this cell.

SCR System Clock Reference, as specified by the MPEG-2 Systems standard. Each bitstream sector has an MPEG-2 Systems header including an SCR.

SOB Stream Object, in general one recording, i.e. one take.

SOBU Stream Object Unit, has a size of 64 Kbytes corresponding to 32 sectors or 32 packs. A SOB consists of N SOBUs with N≧1. The duration of a SOBU is described by its assigned IAPAT. For the SOBU number a running index 'k' is used.

SOBN SOB number, for which a running index 'm' is used.

SOB_S_APAT SOB start APAT, the absolute start timestamp of a complete take.

SOB_E_APAT SOB end APAT, the absolute end timestamp of a complete take.

SR DVD Stream Recording.

STB Settop box.

TE Temporary erasure.

TE flag 2-bit flag or field for a cell:

'00b'=normal cell; within one program in the ORG_PGC, cells of this type shall not be directly contiguous, except in case of an SCR discontinuity;

'01b'=TE cell does not have ERA_S_APAT and ERA_E_APAT;

'10b'=TE cell which has ERA_S_APAT and ERA_E_APAT.

In the simplified overall system block diagram of FIG. 1 an application device AD, for instance a settop box, interacts via an interface IF, e.g. an IEEE1394 interface, with a streamer device STRD, i.e. a DVD SR recorder. A streamer STR within STRD sends its data via output buffering & timestamping handling means BTHO to IF and receives from IF data via input buffering & timestamping handling means BTHI. STRD includes a memory RAM storing the above mentioned information file or files. Controlling means CM control upon user command the preliminary erasure marking and the permanent erasure or complete reconstruction, which controlling means interact with the memory RAM. CM also controls STR.

AD sends its data via output buffering & timestamping handling means BTHOAD to IF and receives from IF data via input buffering & timestamping handling means BTHIAD.

FIG. 2a depicts a stream pack that contains stuffing packets in the 2018-bytes application packet area.

Remark: In normal stream packs, it is possible that the 2027-bytes Stream Data Area contains a 9-bytes Application Header, an optional Application Header Extension, one optional stuffing byte and normal application packets.

FIG. 2b shows the content of the application packet area for a pack containing the start of a stuffing packet. FIG. 2c shows the content of the application packet area for all subsequent packs containing the remainder of the stuffing packets, if any.

Stuffing packets must comply with the following rules:
Stuffing packets always begin at the start of the Application Packet (AP_PKT) Area of the pack after the pack containing genuine AP_PKT data.
Stuffing packets contain one 4-bytes ATS, followed by as many zero bytes as are required to fill the Application Data Areas of the remaining packs of the current SOBU. Therefore, the total length of a stuffing packet is $(4+2014+n*2018)$ bytes, wherein $0 \leq n \leq 31$.
The ATS of a stuffing packet is set as follows:
In a SOBU where at least one pack contains genuine AP_PKT data, the ATS of the stuffing packet is set to the ATS of the AP_PKT preceding the stuffing packet.
In a SOBU#k wherein no real AP_PKT data are contained, the ATS of the stuffing packet is set to $ATS=SUM\_IAPAT(k-1)[13 \ldots 0]*2^{18}$, wherein SUM_IAPAT(k-1) is the summation of the IAPAT values from number 1 until number (k-1) and 'SUM_IAPAT(k-1)[13 . . . 0]' denotes the 14 least significant bits of SUM_IAPAT(k-1).

All packs containing stuffing packets or parts of stuffing packets are to be constructed as follows:
The SCR of the Pack header is calculated according to $SCR=SCR\_previous+(2048*8 \text{ bits})/(10.08 \text{ Mbps})$, wherein SCR_previous denotes the SCR of the previous pack.
The PES Packet Header and sub_stream_id are to be specified like for all other PES Packets according to:

| Field | Number of bits | Number of bytes | Value | Comment |
|---|---|---|---|---|
| packet_start_code_prefix | 24 | 3 | 00 0001h | |
| stream_id | 8 | 1 | 1011 1111b | private_stream 2 |
| PES_packet_length | 16 | 2 | 07ECh | 2028 |
| sub_stream_id | 8 | 1 | 0000 0010b | Stream Recording Data |

The features for temporal erasure are:
The Format allows complete reconstruction for any TE part of a stream.
The Format allows for the TE parts start and end location marks that are time-based with APAT precision, because a user is not aware of the technical features allowed by the SOBs, SOBUs or MAPLs.

During a recording, the Format allows that the TE parts are permanently erasable without any view into the stream, i.e. without reading corresponding information from the disc (this represents a real-time recycling of disc capacity).

The realisation of these preconditions is achieved by using a TE flag inside the Cells. A Cell represents a part of a bitstream. A Cell is described by its start timestamp (SC_S_APAT), its end timestamp (SC_E_APAT) and the related take or SOB number (SOBN), and the TE flag indicates Cells that are temporarily erased.

FIGS. 3 to 6 each show one single recording or take, according to the current SR spec., that is initially represented by a single cell#k with TE flag '00'. When temporally erasing a part of the recording, the original cell#k is split into e.g. cell#k, cell#k+1 and cell#k+2, wherein cell#k+1 is the cell to be temporally erased, getting a TE flag '10' or '01' depending on whether a SOBU boundary is included or not.

Figure 7:
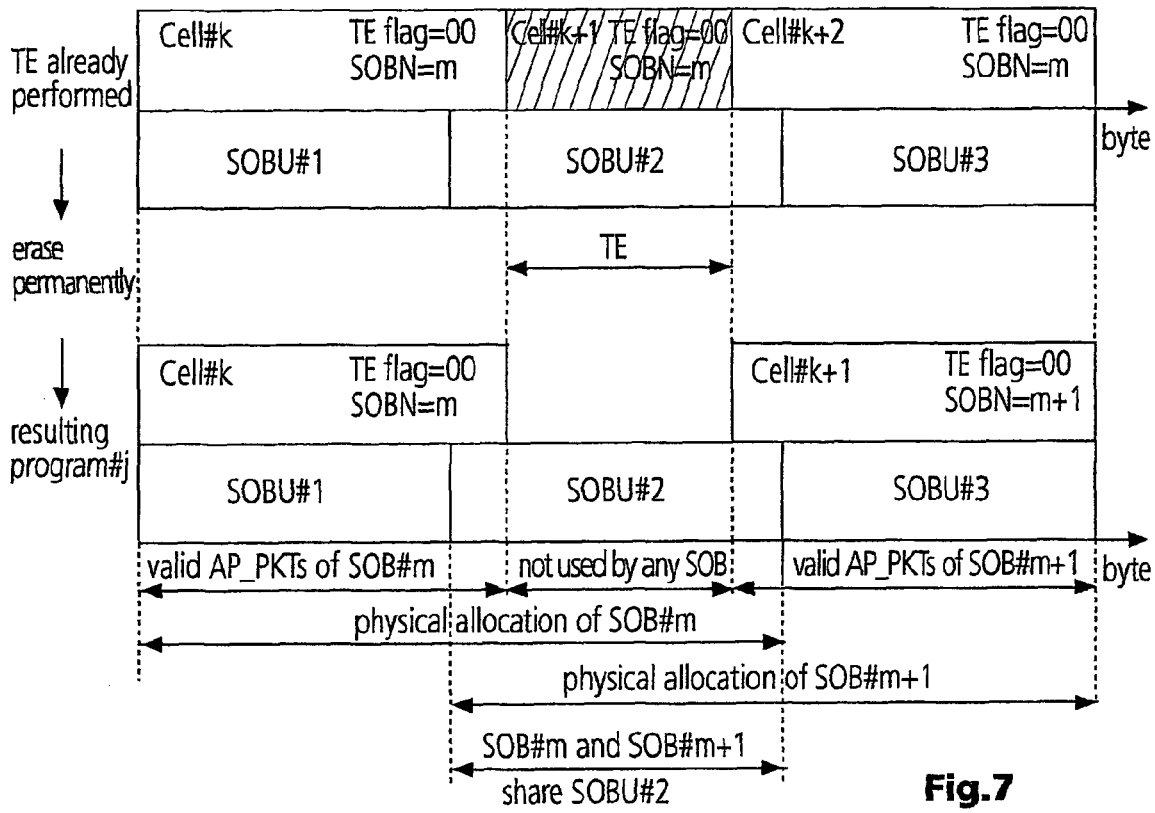

When a TE cell is permanently erased, the area of erased complete SOBUs (if any) is freed for re-use. For details, see the paragraph at the end of the description. On the other hand, if a TE cell is short enough to lie completely within one SOBU (TE flag='01b') as depicted in FIG. 7, the SOBs resulting after permanent erasure will share the same SOBU.

FIG. 5a and FIG. 6a show the SOBUs/IAPATs #1 to #6 of original cell#k. FIG. 5b shows a TE cell including three SOBU borders. SC_S_APAT and SC_E_APAT of TE cell#k+1 are located prior to ERA_S_APAT of SOBU#3 and after ERA_E_APAT of SOBU#4, respectively. Following PE of this cell, SOBU#5/IAPAT#5 and SOBU#6/IAPAT#8 of-original cell#k+2 of SOB#n become SOBU#1/IAPAT#1 and SOBU#2/IAPAT#2, respectively, of cell#k+1 of new SOB#n+1.

FIG. 6b depicts a TE cell#k+1 according to FIG. 5b, but including two SOBU borders only. In FIG. 6c a further bitstream part TE cell#k+2 directly following TE cell #k+1 is shown. The remaining part of previous cell#k+2 is now cell#k+3. In FIG. 6d previous TE cell#k+1 part is recovered and belongs again to original cell#k. Previous TE cell#k+2 becomes TE cell#k+1 and previous cell#k+3 is now renamed to cell#k+2.

Figure 5:
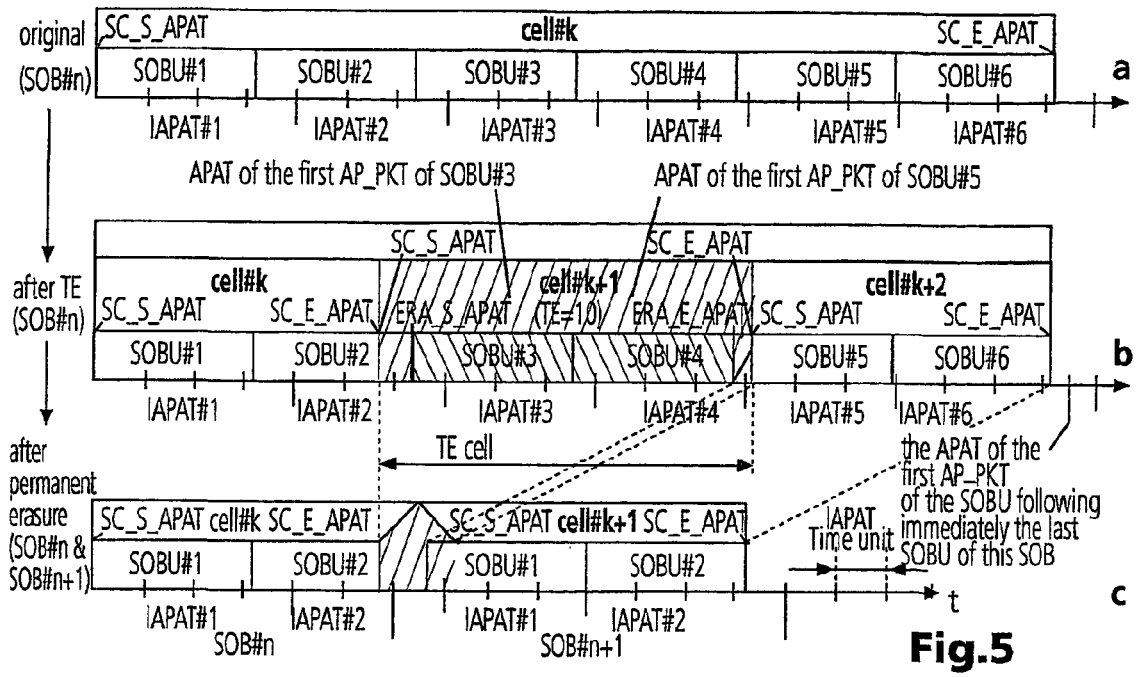
Figure 6:
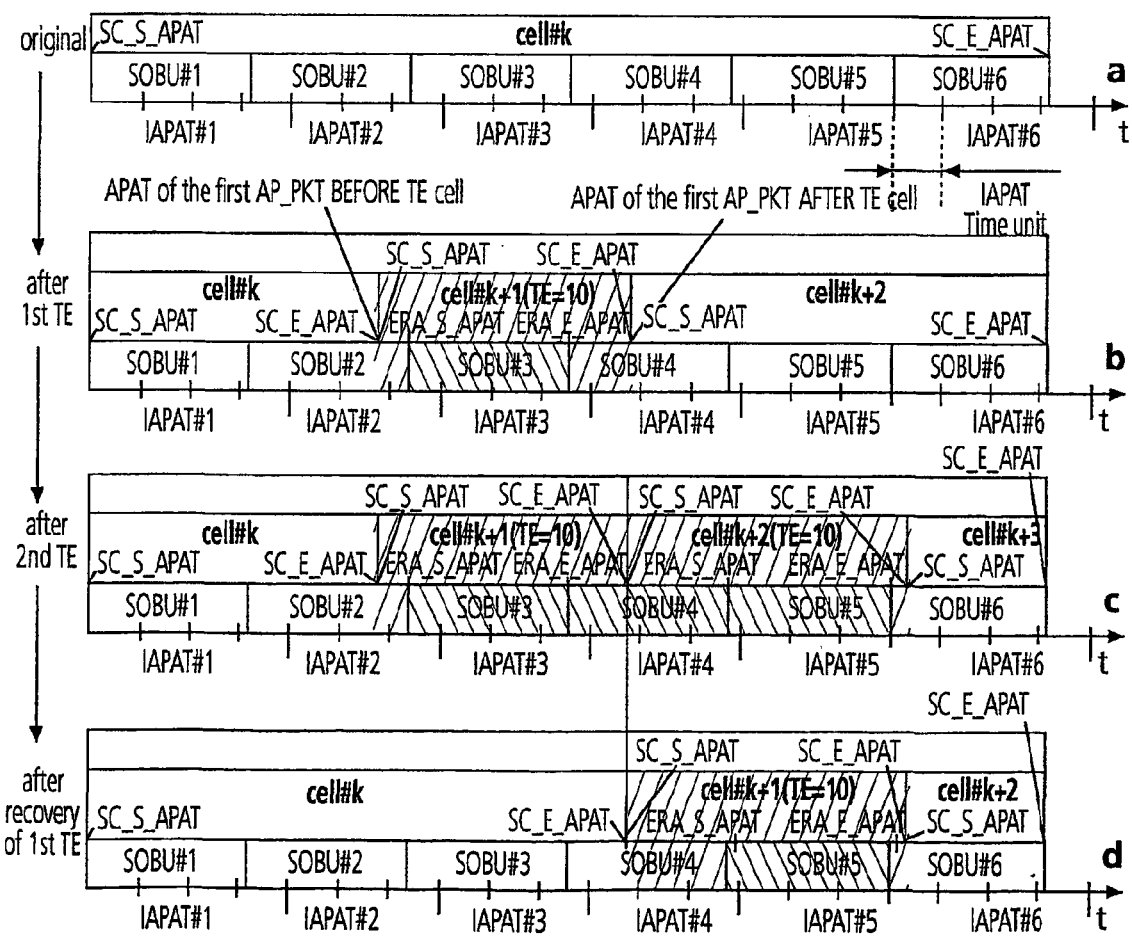

The examples depicted in FIG. 5 and FIG. 6 explain the definition of TE cells. The diagonally ascending hatched parts of both figures show the not presentable TE parts of the stream. The diagonally descending hatched parts show temporarily erased complete SOBUs.

According to the invention, a special definition of the timestamps or values SC_S_APAT, SC_E_APAT, ERA_S_APAT, ERA_E_APAT and the TE flag allows on-the-fly a flexible combination of TE and recovery as well as TE and PE, even if stuffing packets are involved.

The inventive timestamp or time value definition is done in such a way that neither SC_S_APAT nor SC_E_APAT point to a stuffing packet.

ERA_S_APAT and ERA_E_APAT only are allowed to point to stuffing packets.

This is necessary to fulfil the following requirement of the current SR specification: it is prohibited for a presentable cell (i.e. a normal or non-TE cell) to start or to end with stuffing (i.e. at a stuffing packet), even if contiguous to an on-the-fly permanent erasure of a TE cell.

Concerning the Inventive Rules for SC_S_APAT and SC_E_APAT for Cells:

The normal cells and the TE cells point into its assigned SOB, i.e. if SC_E_APAT is equal to SOB_E_APAT of its assigned SOB, then the corresponding cell ends with the last Application Packet (AP_PKT) of its assigned SOB.

The following nomenclature is used:
a) Cell#k denotes a normal or an TE cell;
b) $SC\_S\_APAT_k$ and $SC\_E\_APAT_k$ denote the APAT of the first and the last AP_PKT of cell#k;
c) SOBN(k) denotes the assigned SOB number of cell#k.

With this nomenclature, SC_S_APAT and SC_E_APAT of normal cells and TE cells are defined by the following rules:
a) $SOB\_S\_APAT_{SOBN(k)} \leq SC\_S\_APAT_k \leq SC\_E\_APAT_k \leq SOB\_E\_APAT_{SOBN(k)}$;
b) $SC\_S\_APAT_k$ is equal to the APAT of the AP_PKT inside SOB#SOBN(k) which represents the first AP_PKT of cell#k;
c) SC_E_APATk is equal to the APAT of the AP_PKT inside SOB#SOBN(k) which represents the last AP_PKT of cell#k.

Figure 1:
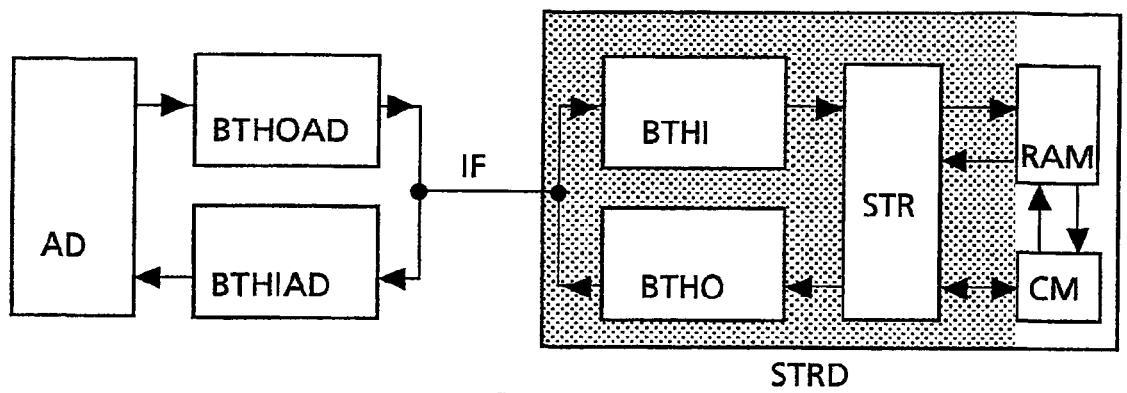
Figure 2:
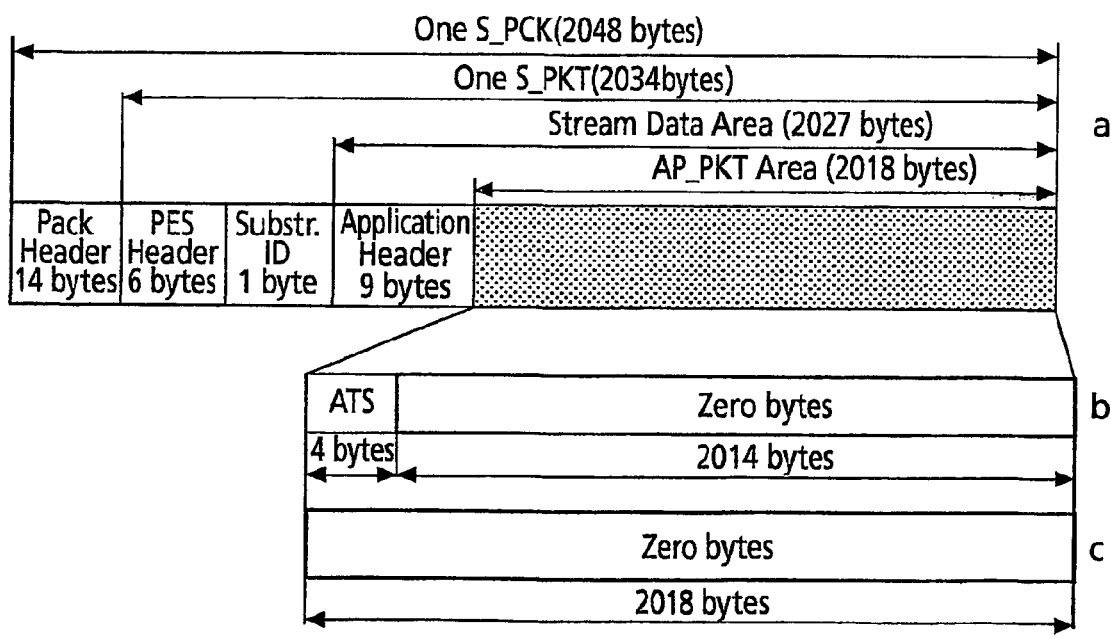
Figure 3:
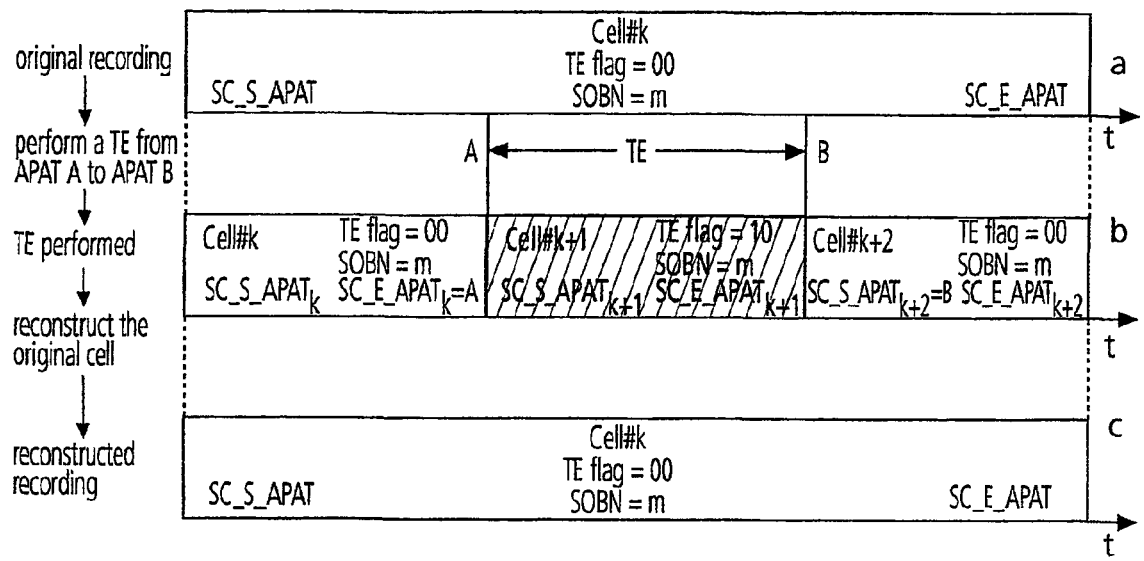
FIG. 3 shows an example for the principle of performing the TE process and the complete reconstruction of the original cell, whereby the complete Navigation data is identical with the corresponding Navigation data before the temporal erasure. The TE cell occupies the range between time instants A and B that are represented by $SC\_E\_APAT_k$ and $SC\_S\_APAT_{k+2}$.
Figure 4:
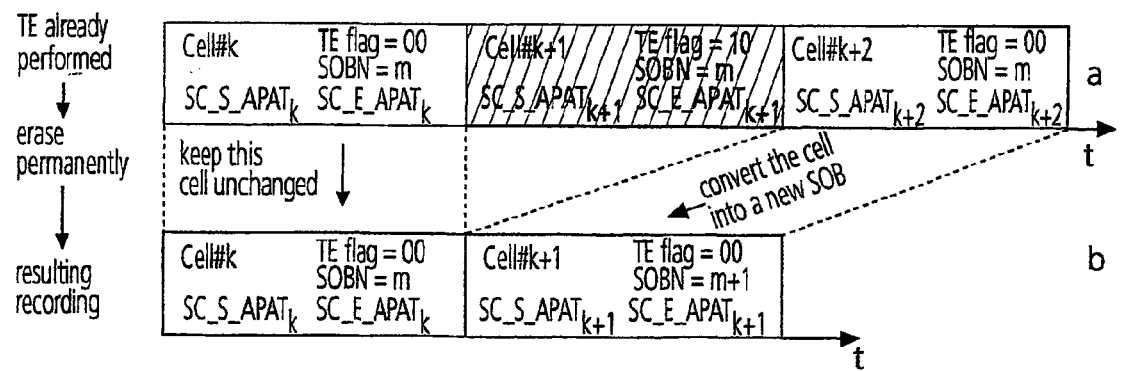
FIG. 4 depicts an example for the principle of a PE of a TE part: cell#k is kept unchanged with SOBN=m, initial TE cell#k+1 is erased permanently, and cell#k+2 becomes new cell#k+1 representing a new SOB with SOBN=m+1.
Figure 8:
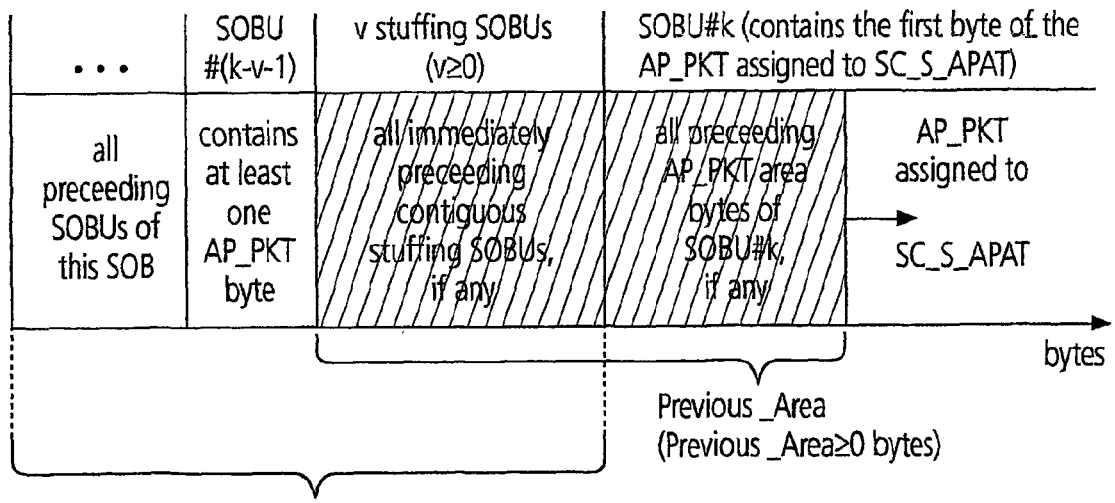
Figure 9:
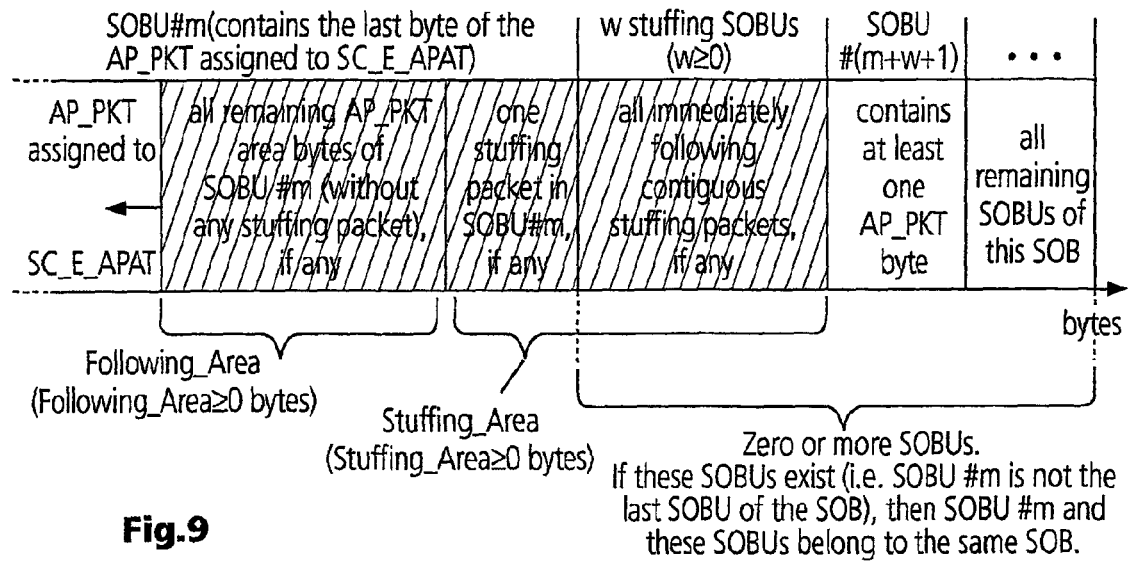

Concerning the Inventive Rules for the TE Flag, ERA_S_APAT and ERA_E_APAT for TE Cells:

For the following rules, the term 'Stuffing SOBU' denotes a SOBU that does not contain any AP_PKT byte, i.e. a SOBU that consists of exactly one stuffing packet as described in connection with FIG. 2. The meaning of the auxiliary terms 'k', 'm', 'v', 'w', 'Previous_Area', 'Following_Area' and 'Stuffing_Area' is depicted in FIG. 8 and FIG. 9.

Rule for the TE flag of TE cells (states '01b' and '01b'):
If k=m and the Previous_Area contains at least one AP_PKT byte assigned to any SOB and the Following_Area contains at least one AP_PKT byte assigned to any SOB, then the TE flag of the TE Cell is set to '01b'. Else, the TE flag of the TE Cell is set to '01b'.

Rules for ERA_S_APAT and ERA_E_APAT of TE cells:
Only if the TE flag of a TE cell is equal to '10b' according to the TE flag rule in the previous paragraph, the general information SC_GI of this TE cell contains ERA_S_APAT and ERA_E_APAT. These two APATs mark those SOBUs that are completely covered by a TE Cell. This information is advantageous for re-using the TE SOBUs on-the-fly, i.e. without any view into the stream stored on the disc or storage medium.

If stuffing packets are present in the bitstream, ERA_S_APAT and ERA_E_APAT of a TE cell always encompass all those Stuffing SOBUs (if any), which directly and contiguously precede and/or follow the AP_PKTs of the TE cell. Nevertheless, SC_S_APAT and SC_E_APAT describe only the first and the last AP_PKT of the TE cell.

In the special case of two contiguous TE cells i and i+1, where one or more Stuffing SOBUs exist between $SC\_E\_APAT_i$ and $SC\_S\_APAT_{i+1}$, ERA_E_APAT of the previous TE cell will be greater than ERA_S_APAT of the following TE cell. In the following, such two TE cells will be denoted as 'Previous Overlapping TE cell' and 'Following Overlapping TE cell'.

The inventive definition of ERA_S_APAT is:
If the Previous_Area contains at least one AP_PKT byte assigned to any SOB,
then ERA_S_APAT corresponds to the ATS occurring first in SOBU #(k+1),
else ERA_S_APAT corresponds to the ATS occurring first in SOBU #(k−v).

The inventive definition of ERA_E_APAT is:
If the Following_Area contains at least one AP_PKT byte assigned to any SOB,
then ERA_E_APAT shall correspond to the ATS occurring first in SOBU #m,
else ERA_E_APAT shall correspond to the ATS occurring first in SOBU #(m+w+1).

If the above definitions cause ERA_S_APAT and ERA_E_APAT to correspond to an ATS of a SOBU after the SOB, an ATS is assumed that corresponds to an APAT defined by the following rules:
this APAT is an integer multiple of the IAPAT Time Unit and
this APAT is greater than SC_E_APAT and greater than all APATs assigned to the ATS values occurring in the Following_Area and in the Stuffing_Area and
this APAT is as close as possible to SC_E_APAT.

If ERA_S_APAT is equal to ERA_E_APAT, no complete SOBU is covered by the TE cell. A TE cell contains complete SOBUs only for the case ERA_S_APAT<ERA_E_APAT. If, however, ERA_S_APAT is equal to ERA_E_APAT for consecutive TE cells of a TE cell chain, then this indicates that complete SOBUs are located between the TE cells.

TE cells that start after the first byte of the first AP_PKT area of a SOBU and end before the last AP_PKT starting in the same SOBU will have no ERA_S_APAT and no ERA_E_APAT. The corresponding TE flag is '01b'.

Figure 10:
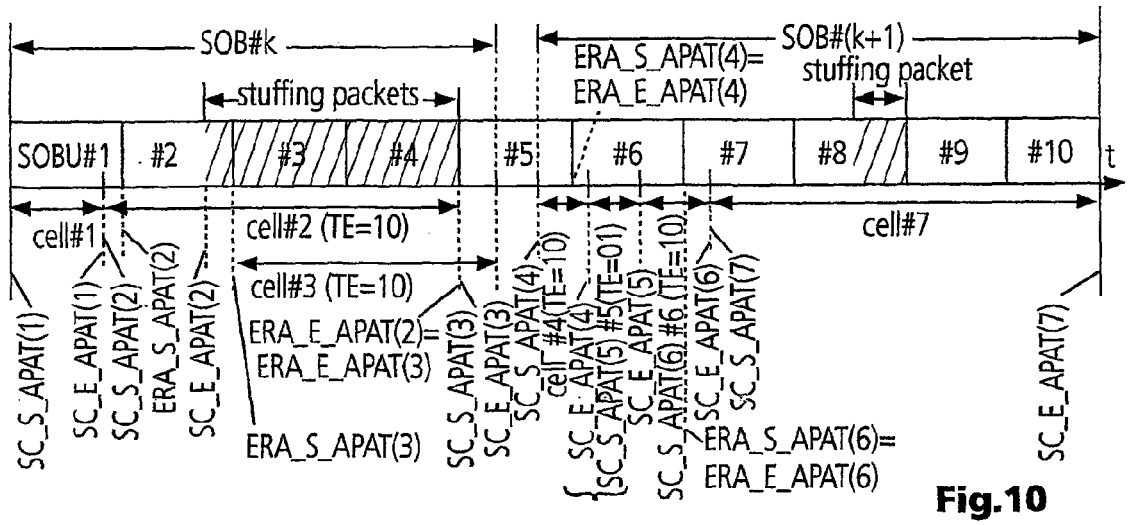

Even SC_E_APAT<ERA_S_APAT is possible, i.e. the stream part described by SC_S_APAT and SC_E_APAT may be outside of the stream part described by ERA_S_APAT and ERA_E_APAT, e.g. cell#3 in FIG. 10.

If one of two Overlapping TE cells is to be permanently erased or completely reconstructed, a special handling of the remaining Overlapping TE cell is necessary:

In case of permanent erasure or complete reconstruction of the Previous Overlapping TE cell, ERA_S_APAT of the Following Overlapping TE cell is set to ERA_E_APAT of the Previous Overlapping TE cell.

In case of permanent erasure or complete reconstruction of the Following Overlapping TE cell, ERA_E_APAT of the Previous Overlapping TE cell is set to ERA_S_APAT of the Following Overlapping TE cell.

Figure 11:
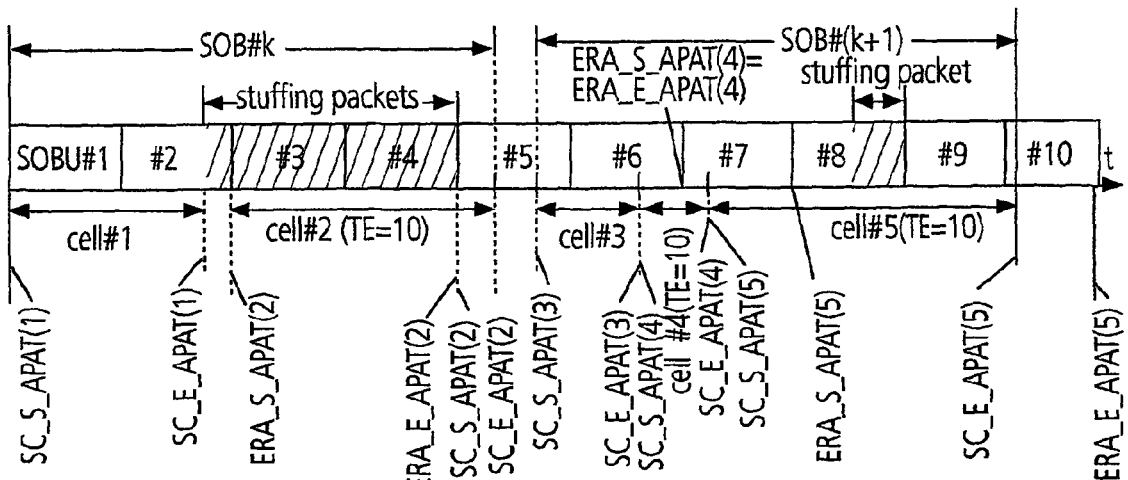

The examples depicted in FIG. 10 and FIG. 11 show possible combinations of cells and TE cells in one program.

Re-use of TE Cells On-the-fly During Recording

The TE cells with TE flag='10b' contain two special APATs: ERA_S_APAT and ERA_E_APAT. The purpose of these two special APATs is to allow re-using TE SOBUs during recording, i.e. when the disc becomes full during recording the Streamer device is able to permanently erase TE cells in order to make new free SOBUs available for continuing the recording without any break. The parameters SC_S_APAT and SC_E_APAT of the TE cell are not exact enough for this purpose, because a search via the mapping list MAPL containing the IAPATs can result in two possible positions of the assigned SOBU (SOBU#m or SOBU#m+1). Therefore a search via the MAPL would require an additional search inside the stream, which is not feasible in real-time. Advantageously, using ERA_S_APAT and ERA_E_APAT that are stored in the information file RAM, the exact SOBU position is locatable without any view into the stream stored on the storage medium.

In case a sequence of TE cells is to be re-used on-the-fly, this leads to re-using all SOBUs beginning (inclusively) with the SOBU described by the ERA_S_APAT of the first TE cell of that TE cell sequence until (exclusively) the SOBU described by the ERA_E APAT of the last TE cell of that TE cell sequence. For example, a re-use of the sequence of TE cells #4 to #6 in FIG. 10 means that the SOBUs described by ERA_S_APAT(4) until ERA_E_APAT(6) will be re-used (which is in this example exactly one SOBU).

If one of two Overlapping TE cells are to be permanently erased or completely recovered, a special handling of the remaining Overlapping TE cell is necessary:

a) Permanent erasure or complete recovery of the Previous Overlapping TE cell:
   Use ERA_E_APAT of the Previous Overlapping TE cell as new ERA_S_APAT of the Following Overlapping TE cell.
b) Permanent erasure or complete recovery of the Following Overlapping TE cell:
   Use ERA_S_APAT of the Following Overlapping TE cell as new ERA_E_APAT of the Previous Overlapping TE cell.

The following shows an inventive example process for a sequence of erasures for comparison with FIG. 6. There are three steps of the process:
a) generate a first TE cell;
b) generate a second TE cell that is immediately following the first TE cell;
c) perform a permanent erasure of the first TE cell, wherein '1' denotes an application packet AP_PKT, '2' denotes a stuffing packet containing stuffing bytes.

a) After First TE
The first TE cell occupies an area from the first AP_PKT in SOBU#1 to the last AP_PKT in SOBU#2 and the following stuffing SOBU (SOBU#3).

```
A            C         D                              B
|111111111|111111222|222222222|111111111|111111111|111111111|
 SOBU#1    SOBU#2    SOBU#3    SOBU#4    SOBU#5    SOBU#6
|<------- cell# (TE) ------->|<-------- cell#2 -------->|
```

A=SC_S_APAT(TE)=ERA_S_APAT
C=SC_E_APAT(TE)
D=SC_S_APAT=ERA_E_$_{APAT}$
B=SC_E_APAT b) After Second TE
The second TE cell occupies an area from the stuffing SOBU (SOBU#3) to the third AP_PKT in SOBU#5.

```
E            F    G       H            I JK          L
|111111111|111111222|222222222|111111111|111111111|111111111|
 SOBU#1    SOBU#2    SOBU#3    SOBU#4    SOBU#5    SOBU#6
|<------- cell#1 (TE) ------>|         |<-- cell#3 -->|
                   |<--- cell#2 (TE) --->|
```

E=SC_S_APAT cell#1 (TE)=ERA_S_APAT cell#1
F=SC_E_APAT cell#1 (TE)
G=ERA_S_APAT cell#2
H=SC_S_APAT cell#2 (TE)=ERA_E_APAT cell#1
I=ERA_E_APAT cell#2
J=SC_E_APAT cell#2 (TE)
K=SC_S_APAT cell#3
L=SC_E APAT cell#3

SOBU#3 is the overlapping area of the Overlapping TE cells #1 and #2.

Now, TE cell #2 shall be permanently erased, i.e. ERA_S_APAT of cell #2 shall be set to ERA_E_APAT of cell #1.

c) After PE of TE Cell#1

```
         H        I   JK               L
|111111111|111111111|111111111|
 SOBU#1    SOBU#2    SOBU#3
|<-TEcell#1->||<--- cell#2 --->|
```

H=SC_S_APAT cell#1 (TE)=ERA_S_APAT cell#1
I=ERA_E_APAT cell#1
J=SC_E_APAT cell#1 (TE)
K=SC_S_APAT cell#2
L=SC_E_APAT cell#2

The inventive procedure allows erasure and re-use on-the-fly, i.e. without any additional view into the stream stored on the storage medium.

It is also possible to already mark TE cells according to the invention at recording time.

The application packets may contain any type of data, e.g. video or audio or additional data like service information. The data rate to be handled in the streamer may therefore occupy a range from e.g. 3 kbit/s for audio signals up to e.g. an 80 Mbit/s peak data rate value for detailed complexly moving scenes of video signals.

The invention claimed is:

1. Method for preliminarily erasing a part or parts of a bitstream recorded, or to be recorded, on a storage medium, wherein:

the recorded bitstream is formatted into stream object units each containing at least one application data packet with a corresponding application time stamp or one stuffing data packet or both, of which stream object units one or more form a cell, wherein each succeeding stuffing data packet also has an application time stamp;
   bitstream parts can be marked as being preliminarily erased cells denoted TE cells;
   following marking TE cells, such TE cells can be either permanently erased or completely reconstructed;
   the start and the end of a cell are defined by a cell start time value and a cell end time value;

the start and the end of a re-usable part of a TE cell are defined by a TE cell start time value and a TE cell end time value;

said cell and TE cell start and end time values are stored in a separate memory allowing fast access, wherein in case a TE cell includes at least one boundary between succeeding stream object units and one of said succeeding stream object units includes at least one application data packet and another one of said succeeding stream object units includes at least one stuffing data packet, involved ones and further adjacent stream object units containing only stuffing data packets are included in said TE cell even if said TE cell would thereby overlap with one or two adjacent TE cells, wherein the corresponding ones of said time values of a current TE cell are selected as follows:

the cell start time value corresponds to the application time stamp of the first application packet of said current TE cell;

the cell end time value corresponds to the application time stamp of the last application packet of said current TE cell;

if the start recording packet arrival time value of said current TE cell describes the start of a stream object unit, or the TE cell contains the start of the stream object, then the TE cell start time value corresponds to the application time stamp of the first application packet or stuffing packet starting in that stream object unit which contains the application packet or stuffing packet with the start recording packet arrival time of said current TE cell, otherwise the TE cell start time value corresponds to the application time stamp of the first application packet or stuffing packet starting in that stream object unit which follows immediately the stream object unit containing the application packet with the corresponding recording packet arrival time value cell start time value;

the TE cell end time value corresponds to the first application time stamp of the first stream object unit following said current TE cell.

2. Apparatus for preliminarily erasing a part or parts of a bitstream recorded, or to be recorded, on a storage medium, wherein:

the recorded bitstream is formatted into stream object units each containing at least one application data packet with a corresponding application time stamp or one stuffing data packet or both, of which stream object units one or more form a cell, wherein each succeeding stuffing data packet also has an application time stamp;

bitstream parts can be marked as being preliminarily erased cells denoted TE cells;

following marking TE cells, such TE cells can be either permanently erased or completely reconstructed;

the start and the end of a cell are defined by a cell start time value and a cell end time value;

the start and the end of a re-usable part of a TE cell are defined by a TE cell start time value and a TE cell end time value, said apparatus including:

means for recording data on said storage medium or for reading data from said storage medium;

interface means for receiving input data for said recording means or for outputting data from said recording means;

a memory storing said cell and TE cell start and end time values in order to allow fast access to said cell and TE cell start and end time values; controlling means for controlling upon user command said preliminary erasure marking and said permanent erasure or complete reconstruction, which controlling means interact with said memory, wherein in case a TE cell includes at least one boundary between succeeding stream object units and one of said succeeding stream object units includes at least one application data packet and another one of said succeeding stream object units includes at least one stuffing data packet, involved ones and further adjacent stream object units containing only stuffing data packets are included in said TE cell even if said TE cell would thereby overlap with one or two adjacent TE cells, wherein the corresponding ones of said time values of a current TE cell are selected as follows:

the cell start time value corresponds to the application time stamp of the first application packet of said current TE cell;

the cell end time value corresponds to the application time stamp of the last application packet of said current TE cell;

if the start recording packet arrival time value of said current TE cell describes the start of a stream object unit, or the TE cell contains the start of the stream object, then the TE cell start time value corresponds to the application time stamp of the first application packet or stuffing packet starting in that stream object unit which contains the application packet or stuffing packet with the start recording packet arrival time of said current TE cell, otherwise the TE cell start time value corresponds to the application time stamp of the first application packet or stuffing packet starting in that stream object unit which follows immediately the stream object unit containing the application packet with the corresponding recording packet arrival time value cell start time value;

the TE cell end time value corresponds to the first application time stamp of the first stream object unit following said current TE cell.

3. Method according to claim 1, wherein in case a current TE cell directly follows a previous TE cell and the previous TE cell is to be permanently erased or completely recovered, or was permanently erased or completely recovered, the TE cell end time value of the previous TE cell is used as the TE cell start time value for the current TE cell.

4. Method according to claim 1, wherein in case a current TE cell directly follows a following TE cell and the following TE cell is to be permanently erased or completely recovered, or was permanently erased or completely recovered, the TE cell start time value of the following TE cell is used as the TE cell end time value for the current TE cell.

5. Method according to claim 1, wherein said application data packets contain encoded video data.

6. Method according to claim 1, wherein said application data packets contain encoded audio data.

7. Method according to claim 1, wherein content of the recorded bitstream, or of the bitstream to be recorded, stems from an MPEG-2 Systems standard source signal.

8. Method according to claim 1, wherein, in case the first byte of a TE cell is not the first byte of the first application data packet area of the current stream object unit, the TE cell start time value points to the stream object unit immediately following said current stream object unit.

9. Method according to any claim 1, wherein, following said preliminary erasure, for re-using on-the-fly freed stream object units of permanent on-the-fly erased TE cells, the current TE cell start time value and the current TE cell end time value of a current TE cell are read from said separate memory.

10. Method according to claim 1, wherein the bitstream recorded was provided, or the bitstream to be recorded is provided, via an IEEE 1394 interface.

* * * * *